United States Patent [19]

Fleckensteim

[11] 4,158,628

[45] Jun. 19, 1979

[54] SENSOR DEVICE FOR WATER SOFTENER SYSTEM

[76] Inventor: Andrew J. Fleckensteim, 20580 Enterprise Ave., Brookfield, Wis. 53005

[21] Appl. No.: 912,390

[22] Filed: Jun. 5, 1978

[51] Int. Cl.² .............................................. B01D 15/06
[52] U.S. Cl. ..................................... 210/85; 210/96.1; 210/139; 210/190
[58] Field of Search ................. 210/96 R, 85, 87, 139, 210/190

[56] References Cited

U.S. PATENT DOCUMENTS

| 3,250,392 | 5/1966 | Luck | 210/96 R |
| 3,477,576 | 11/1969 | Lock et al. | 210/96 R |
| 3,512,643 | 5/1970 | Forss | 210/96 R |
| 3,578,164 | 5/1971 | Weiss | 210/96 R |

Primary Examiner—John Adee

[57] ABSTRACT

A sensor device for use in water treatment systems of the type employed for softening the water which is adapted to be immersed in the mineral bed commonly used in such systems and which is sensitive to the calcium/sodium state of the system and capable of changing its dimensions in response to such state and effect contact in an electrical circuit to control operation of the system.

2 Claims, 3 Drawing Figures

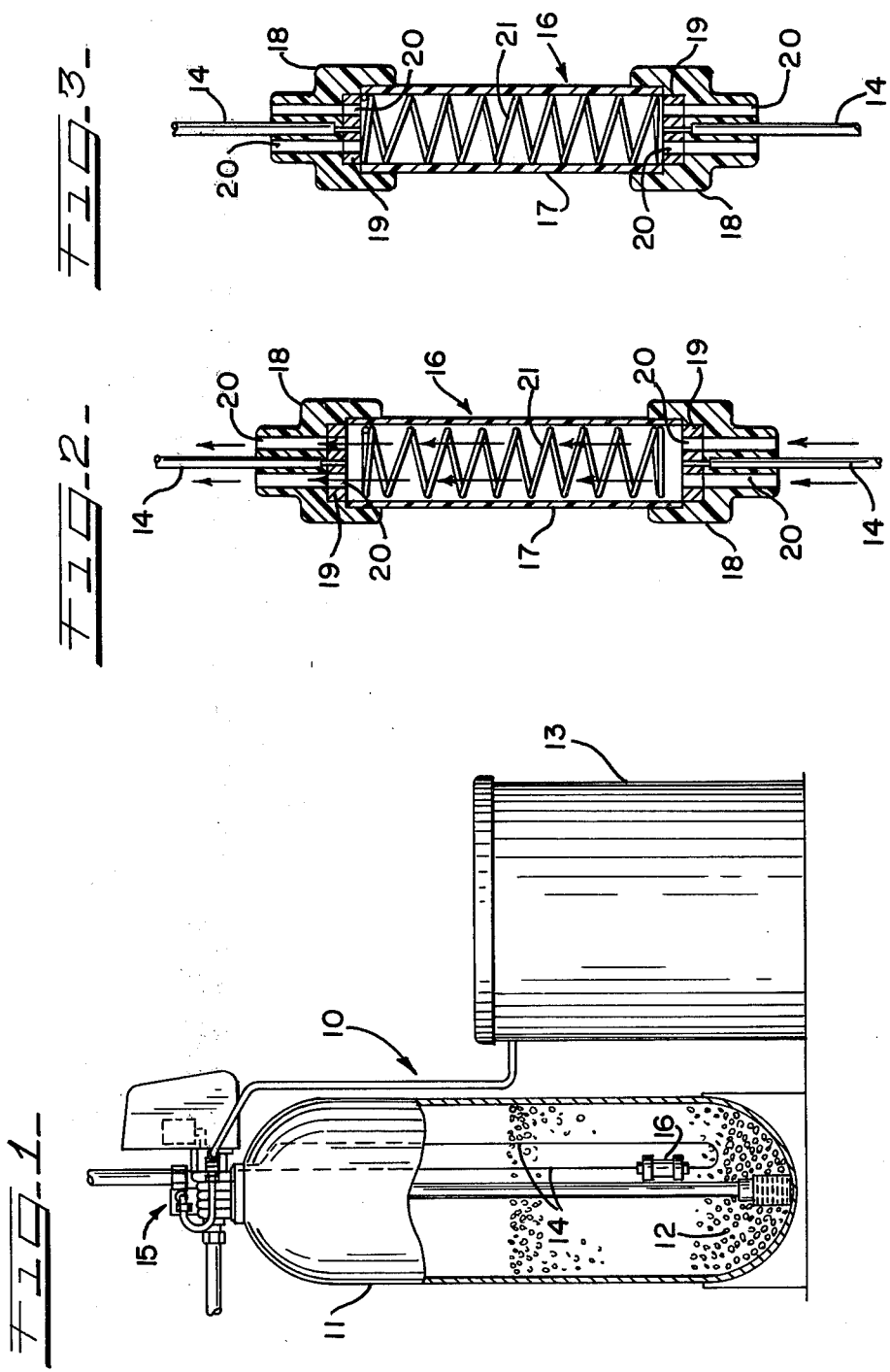

SENSOR DEVICE FOR WATER SOFTENER SYSTEM

BACKGROUND OF THE INVENTION

Because of the discharge of salt brine into the environment from water softening systems, sensing of the time for regeneration in such systems has become of increased importance and improved sensors can contribute to improved conditions in the environment. Heretofore, sensors have been provided which sense a difference in conductivity of a resin in a calcium state and such resin in a sodium state, but this type of device requires comparison of changing resistances as distinguished from the system utilized herein, where the sensor senses the difference between a dead short and the conductivity of the water between a contact member and a circuit completing member. Since the conductivity of water is very high it becomes quite simple in this system to sense a dead short electronically versus any resistance and this simplifies the electronic circuitry utilized in this improved sensor as compared to previous designs.

Certain prior art sensing devices have been embedded in the exchange material of softener systems but these devices have been enclosed and therefore were not fully sensitive to changing conditions in the material and were slow to respond to such changes. Examples of sensing devices of this type can be found in U.S. Pat. Nos. 3,477,576, 3,512,634 and 3,250,392 wherein a strip of ion exchange ribbon was placed inside a plastic tube and as a consequence the ribbon was very sluggish in responding to changing conditions of the water because it was not in direct contact with the ion exchange material in the treatment tank and because the ribbon was enclosed contact with the flow of water was not readily made. Because of the enclosed type construction filter screens were incorporated which became clogged and further delayed response time of the sensing element because of the restricted flow of water through the screens. Further, the screens regardless of whether they were clogged or clean, necessitated greater hydraulic pressure to force the water through the screens to come in contact with the ion exchange ribbon. Also, because of the very nature of the construction utilized in these sensing devices they are more complicated and require additional space.

SUMMARY OF THE INVENTION

This invention provides a sensor device that is direct acting in response to the calcium/sodium state of the ion exchange material in which it is fully immersed and having full flowing contact with the water in the treatment tank so that it is fully responsive to such state immediately, as changes occur. This sensor is tubular and the sensor element comprises a tube of ion exchange material which reacts to the state of the ion exchange material in the treatment tank by expanding and contracting according to the calcium or the sodium state of the tube. The device incorporates electrical contacts and when the tube is expanded the contacts are open and when the tube is contracted the contacts are closed to complete an electrical circuit.

When the ion exchange material in the tank has been regenerated it is in the sodium state and the material of the tube as well, so that it is expanded and the contacts are open to open the electrical circuit. When the ion exchange material in the tank is depleted both the material of the tank and that of the tube are in the calcium state so that the contacts in the sensor are closed to complete the electrical circuit.

The sensor device tube is mounted in non-metallic end pieces which have openings that subject the interior of the tube to the flow of water from the treatment tank. The end pieces each include a metal contact interior surface, connected in an electrical circuit and a coiled metal member in the form of a compressible spring is disposed in the tube element and adapted to be engaged at its ends by the contact surfaces when the sensor is contracted to complete the electrical circuit through the sensor device.

The interior spring not only provides the means for completing the electrical circuit but the compressibility thereof enables the sensor tube to continue to contract after contact is completed with the metal contacts in the end pieces so that damage to the end pieces, or rupture thereof from the tube connecting them is avoided. The sensor assembly is designed to be disposed in the treatment tank of a water softening system and completely immersed in the ion exchange material with the water of the tank flowing through the sensor.

OBJECTS OF THE INVENTION

It is the primary objective of this invention to provide an improved sensor device adapted to be completely immersed in the treatment tank of a water softening system.

The principal object of the invention is the provision of a sensor that reacts to the calcium/sodium state in the treatment tank of a water softening system that is in direct contact with the ion exchange material in the tank.

An important object of the invention is to provide a sensor device including a sensor element, sensitive to a calcium/sodium state, mounted between nonmetallic end pieces each of which includes a metal contact member in an electrical circuit and having a member in association with the element to complete the circuit when engaged with both of the contacts.

Another object of the invention is the provision of a sensor device that expands, or contracts, according to a calcium/sodium state, including spaced contact members that are pushed apart, or drawn in, by the expansion or contraction and a circuit completing member engaged by both contact members when drawn in.

A further and more specific object of the invention is to provide a sensor device of tubular construction having a sensor element in the form of a tube connected between opposite end pieces of nonmetallic material having openings in communication with the interior of the tube with metal contact members on the interior of the respective end pieces and a circuit completing member in the tube engageable with the contact members to complete a circuit.

A still more specific object of the invention is the provision of a sensor device having a sensor element in the form of a tube made from a material that expands, or contracts, according to a calcium/sodium state with nonmetallic end pieces mounted on the tube each having a metal contact on the inner side and an opening in communication with the interior of the tube and a metal spring-like circuit completing member in the tube normally out of engagement with the contacts when the tube is expanded and engaging the contacts when the tube is contracted and capable of being compressed when the tube is further contracted.

DESCRIPTION OF THE DRAWINGS

The foregoing and other and more specific objects of the invention are attained by the sensor device of the construction and arrangement illustrated in the accompanying drawings wherein FIG. 1 is a general view of a typical water softener system incorporating a sensor element according to this invention in an electrical circuit that activates the system to regenerate when the sensor so indicates;

FIG. 2 is a detail sectional view of the sensor device in the normal non-regenerating open position with the interior contacts out of engagement; and FIG. 3 is a similar of the sensor with the contacts closed thus calling for regeneration.

DESCRIPTION OF PREFERRED EMBODIMENT

In the drawings the reference 10 generally indicates a water softener system of conventional type including a water treatment tank 11 containing a mineral bed, or ion exchange material 12 which softens the water flowing through the tank by removing the hardness elements and which, when depleted, must be regenerated by flushing with a brine solution from a brine tank 13 and then the mineral bed is rinsed to remove any brine residue. The ion exchange material as herein disclosed comprises sulfonated polystyrene but other exchange materials, such as a zeolite, may be used in the treatment tank without departing from the inventive concept. An electrical circuit 14 operatively connected with controls 15, shown mounted on top of the treatment tank, passes through a sensor device 16 immersed in the ion exchange material 12. The circuit 14 controls the functioning of a regeneration valve in the controls 15.

The sensor 16 indicates when regeneration of the ion exchange material is required and must be in the closed condition to enable regeneration to take place as regulated by the regeneration valve of the controls 15. The sensor circuit 14 might be activated at all times so that regeneration would occur when the sensor indicates that the ion exchange material 12 is in a calcium state, but from a practical standpoint, it is prefereble that the sensor be associated with a time-of-day device, which would activate the circuit at a particular time of day, such as 2:00 a.m., whereby the system will regenerate only at that time.

The sensor device 16 is shown in complete detail in FIGS. 2 and 3 and comprises a generally tubular structure including a tube 17 mounted in opposite end pieces 18 of similar construction in which the tube 17 is secured. The end pieces 18 are nonmetallic and each include an interior metal contact member 19 in operative electrical connection with the circuit wires 14. The end pieces and the contact members are provided with through openings 20 communicating with the interior of the tube 17 and which provide for the flow of water from the treatment tank 11 into and through the tube 17 thus providing intimate contact of the tube, both on the interior surface thereof, as well as the exterior surface, with the calcium/sodium state of the mineral bed 12 and the water in the treatment tank so that immediate response is had to any change in this condition.

The tube 17 comprises the sensor element and is fabricated from a resin which is an ion exchange material that expands, or contracts, depending upon whether the material of the tube is in a calcium state or in a sodium state. When the mineral bed 12 is fully regenerated the ion exchange material in tank 11 is in the sodium state and therefore the tube 17 also is in the sodium state so that it expands and regeneration would not be called for under these conditions. When the ion exchange material 12 in the treatment tank is depleted it reaches the calcium state so that the ion exchange material of the tube 17 also is in the calcium state and under these conditions the tube 17 contracts to call for regeneration of the mineral bed 12.

Contraction of the sensor element 17 completes the electrical circuit to the regeneration valve in the controls 15 through a circuit completing member 21 within the tube 17. This circuit completing member 21 is in the form of a current conducting metal spring which, in its expanded condition, is of a maximum length such that it is out of engagement with both of the contacts 19 when the tube 17 is expanded, thus leaving the electrical circuit 14 open so that regeneration is not called for, as shown in FIG. 2. When the tube 17 is contracted, as shown in FIG. 3, the circuit completing spring 21 is in engagement at its opposite ends with both of the contacts 19, thus closing the electrical circuit and calling for regeneration with the result that the regenerating valve in the controls 15 is activated to start the regenerating process. Both of these actions of the sensor device are in accordance with the calcium/sodium state of the sensor element 17 which, of course, is directly responsive to the calcium/sodium state of ion exchange material 12 in the treatment tank.

When the current conducting spring 21 is in full engagement with both of the end contacts 19 the tube 17 may continue to contract as dictated by the calcium/sodium state of the ion exchange material in the treatment tank. Under these conditions the spring 21 is compressed to accommodate the further closure of the contacts and thereby avoids any excessive pressure on the contacts and end pieces 18 to avoid any possible damage to the sensor device, such as rupture of the end pieces from the tube 17, as might be the case if the circuit completing member were rigid and not compressible. Thus, the spring 21 affords a nonrigid connection to complete the electrical circuit through the sensor device and which is resilient while continuing to complete such circuit, so that damage to the sensor device is completely avoided.

The important concept in this invention is most importantly realized in the disposition of the sensor element 17 in direct contact both with the ion exchange material 12 and with the water in the treatment tank so that with the element fully immersed in the tank 11, the outer surface of the tube 17 is in full contact with the material 12 and with the water and the inner surfaces of the tube are completely washed with the water from the tank as it flows freely through the tube by means of the openings 20 in the end pieces 18 whereby the sensor element is most responsive and completely sensitive to the calcium/sodium state existing in the treatment tank.

The ion exchange resin material of the sensor element tube 17 is such that the tube contracts and expands under the changing conditions in the treatment tank 11 which may be considered as undergoing a continuing reversible cycle where the state changes from calcium sodium, to calcium and to a sodium state. This cycle continues throughout the effective operating life of the system and the tube 17 has been found to be most sensitive and responsive to these conditions in the treatment tank and the direct immersion of the tube element in the treatment tank causes this sensor element to react more closely to the cycles and reactions taking place in the ion exchange mineral bed. Because the sensor element 17 is in the form of a tube it can be brought into intimate contact with the water in the treatment tank on both its internal diameter as well as the exterior diameter thereof and because of this complete contact the sensor responds very quickly to variations in the mineral bed 12.

When the sensor tube element 17 contracts under the calcium state, the tube will contract axially and also will contract to some extent diametrically. Accordingly, the metal spring 21, as best shown in FIG. 2, is made of somewhat less diameter than the inside diameter of the tube 17 so that the tube can be left free to shrink transversely to the axis thereof until the tube element comes into contact with the outside diameter of the spring. When the tube is thus engaged upon the spring the latter will serve to reinforce and stiffen the tube, since the sensor device is located in the treatment tank within the mineral bed 12 and adjacent to the lower portion of the tank.

From the foregoing it will readily be seen that a direct acting sensor device has been provided which is in full contact with an ion exchange material in a water treatment tank and with the water in the tank so that the sensor is immediately responsive to varying cycles transpiring in the tank so that regeneration of the system occurs only as needed and excessive discharge of salt brine into the environment is avoided.

What is claimed is:

1. In a water treatment system for softening water a sensor device in a water treatment tank containing an ion exchange material, and a sensor element responsive to calcium/sodium conditions operatively associated with the sensor device, said sensor element being in direct contact with said ion exchange material and expansible and contractible according to said calcium/sodium condition, said sensor element being in the form of a tube, the exterior diameter of such tube being in direct contact with the water and the ion exchange material in the tank, and the water in the tank flows through the interior of the tube in direct contact therewith, said tube mounted in end pieces at respectively opposite ends of the tube, each said end piece having an opening to the interior of the tube, said end pieces each have a metallic interior surface, an electrical circuit operatively connected with said surfaces, and a circuit completing member in said tube normally out of contact with said surfaces brought into direct contact therewith by contraction of said tube in response to a calcium state in said treatment tank, and said circuit completing member comprising a metal spring having end contact with said surfaces to complete the electrical circuit and compressible after circuit completing contact is made upon further contraction of said tube.

2. A water treatment system as set forth in claim 1 wherein said end pieces and said tube are made of electrically non-conducting materials.

* * * * *